United States Patent
Hanback

[15] 3,672,050
[45] June 27, 1972

[54] TUBE CUTTER

[72] Inventor: Francis J. Hanback, Palos Verdes, Calif.

[73] Assignee: McDonnell Douglas Corporation

[22] Filed: Aug. 5, 1970

[21] Appl. No.: 61,197

[52] U.S. Cl. ..........................................30/99, 30/101, 72/71
[51] Int. Cl. ..............................................................B23d 21/08
[58] Field of Search........................30/94, 99, 101, 102, 347; 81/59.1; 408/120; 72/70, 71

[56] References Cited

UNITED STATES PATENTS

| | | | |
|---|---|---|---|
| 2,379,177 | 6/1945 | Pavey | 30/99 |
| 2,782,500 | 2/1957 | Kelley | 30/99 |
| 1,532,315 | 4/1925 | Karbowski | 30/101 X |
| 3,522,617 | 8/1970 | Kowal | 30/102 X |
| 2,147,032 | 2/1939 | Haury | 30/102 X |
| 3,398,612 | 8/1968 | Batten | 81/59.1 X |

*Primary Examiner*—Andrew R. Juhasz
*Assistant Examiner*—Michael Koczo, Jr.
*Attorney*—Walter J. Jason, Donald L. Royer and Robert O. Richardson

[57] ABSTRACT

A tube cutting tool for the repair of permanently installed piping systems wherein a section of faulty tubing may be removed and a splicing sleeve fitted thereover for permanent repair in the piping system. The tool may be used in confined quarters since it does not rotate around the tubing. The cut is free of chips, burrs, or other minute particles that require purging of the line before use.

5 Claims, 7 Drawing Figures

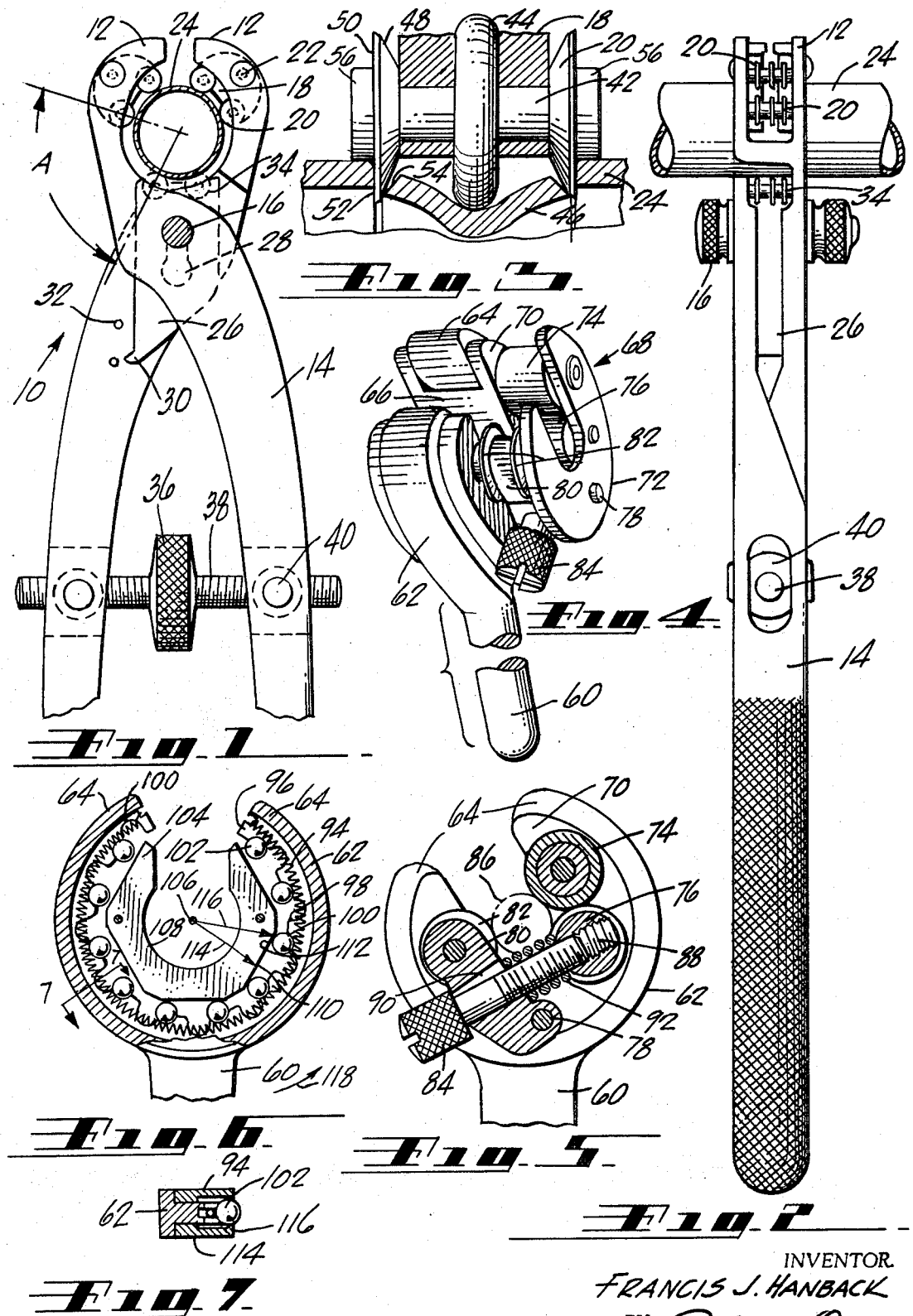

TUBE CUTTER

BACKGROUND OF THE PRESENT INVENTION

The simplicity and other advantages of a permanent piping system (lightweight, increased reliability, and decreased maintenance requirements) have resulted in industry-wide acceptance of this system. In the near future, both commercial and military aircraft will rely on permanent pipe connections for hydraulic water and various other fluid systems. A weight reduction of approximately 500 pounds per airplane is one of the most tangible values a manufacturer receives in the use of this system in aircraft production. Reliability projections and service history indicates that permanent piping will have only one permanent leak for every reported twenty leaks occurring now on conventional systems. The infrequent repair in a permanent piping system may be one of a variety of methods involving tube segment replacement. This requires cutting through the tube, fitting a sleeve over the ends and making the sleeve connection over the tube leak-proof through swaging, brazing, welding or some other technique.

Known tube cutters commonly employ a hook-shaped member with rollers on the inner wall and a cutting wheel which contacts the tube from the opposite side. A threaded knob is used to place the cutting wheel in contact with the tube and thereafter the tool is given a full 360° rotation to initiate a cutting groove around the tube. Thereafter the knob is progressively turned to cause the wheel to penetrate the tube progressively until the tube wall is severed. This tool has two serious drawbacks. It requires access for the full rotation of the tool around the tube, which is not always feasible after the tubing has been installed, and it does not prevent minute metal chips from contaminating the tube, requiring the tube to be flushed and cleaned before use.

SUMMARY OF THE PRESENT INVENTION

A chipless tube cutter configured as a hand tool has a deflectable handle with a locking means to repetitively capture hand grip forces to load the cutting wheels. Tube cutting may be done with only limited rotation of the tool in order to cut out a section of tubing for piping systems repair. Dual cutting wheels are utilized to provide better tracking, and more precise control, more stability in eliminating side loads from breaking or chipping the cutting wheels and in distributing a more uniform pressure. A non-binding cutting action occurs through the deformation of the tube between the two cutters, resulting in a smooth shear-out on the inside diameter edge of the tube. The cutting wheels have shoulders which roll against and round out the tube outer diameter ends so that there is no tube distortion to hinder the insertion of a splicing sleeve over the ends of the tube. The cut section is retained between the cutting wheels of the tube for removal in lieu of it dropping loosely in the airplane.

BRIEF DESCRIPTION OF THE DRAWINGS

FIG. 1 is a side view of a pliers type tool;
FIG. 2 is a front view of the tool in use;
FIG. 3 is a partial sectional view illustrating the cutting action;
FIG. 4 is a perspective view of a ratchet type tool;
FIG. 5 is a partial side view in section of an alternate embodiment;
FIG. 6 is a sectional view of the ratchet structure; and
FIG. 7 is a sectional view taken along the line 7—7 in FIG. 6.

Reference is now made to FIG. 1 wherein there is shown a pliers type tool 10 having a pair of jaws 12 extending from handles 14 which intersect at pivot 16 and so arranged that as the handles 14 are brought together so also are the jaws 12. Mounted on each jaw is a cutter holder 18 having spaced cutter wheels 20. The cutter holders 18 are pivotally mounted to the jaws at pivot 22 so that as the jaws are moved together over a pipe 24, all cutter wheels will remain in contact with the tubing to be cut.

Mounted over pivot 16 and between the handles is an adjusting bracket 26 having a key slot 28 to permit the adjusting bracket to be moved to either of two selected positions for cutting larger and smaller sizes of pipes. Indicia marker 30 on the bracket points to selected indicia 32 on the handle to indicate the adjustment provided. Another pair of cutting wheels 34 are rotatably mounted in spaced relationship on the inner edge of the adjusting bracket 26.

A thumb screw 36 having reverse threaded shafts 38 extending from either end are threadedly engageable with pivot holders 40, pivotally mounted on the handles 14. Rotation of thumb screw 36 in one direction moves the handles 14 together and the rotation in the opposite direction moves the handles 14 apart. In this manner the jaws 12 may be locked over a tube 24 and progressively tightened as a handle 14 is pivoted through an arc A, this angle being the angular distance between the closest cutter wheels 20 on cutter holder 18 and cutter wheel 34 on the adjustable bracket 26.

An end view may be seen in FIG. 2. Here is shown pivot holder 40, pivotally mounted on handle 14 to receive the end of screw 38 for adjustably positioning handle 14 and thus the jaws 12 over tube 24. Pivot 16 preferably is a nut and bolt, both knurled so that the handles 14 may be loosened sufficiently to permit the adjusting bracket 26 to be moved to the desired position, depending upon the size of the tube 24 to be cut.

The cutter wheels 20 can be seen in enlarged form in FIG. 3. Here is shown a pair of cutter wheels 20 mounted on an axle 42 which is rotatably mounted on cutter holder 18. Spaced between the cutter wheels 20 is a roller or tube deformer 44 which preferably is of a greater radius than that of the cutter wheel 20 to deflect inwardly the section 46 of the tube 24 that is cut out by the pair of cutter wheels 20. Preferably, the cutter wheels 20 have a taper 48 facing inwardly and a flush outer surface 50 which provides for a smooth shear-out on the inner diameter edge 52 of the tube 24. As can be seen, the roller 44 bears inwardly on section 46 causing it to bend, as shown, so that its cut edges 54 do not bear against the tapered surface 48 of the cutter wheel 20. Wheel shoulders 56 extend outwardly from the cutters and roll over the outer circumference of the ends of the tubing remaining in the system. This smooths out any distortion of the tubing so the splicing sleeve may easily be inserted thereover.

An alternate embodiment is shown in FIGS. 4, 5, 6 and 7. In this form a single handle 60 is attached to a ratchet body 62 having a pair of jaws 64 for placement around the tube to be cut. A ratchet wheel 66 is adapted for one-way rotation around the pipe and has affixed to it the cutter wheel mechanism 68 for circumferential travel therewith. The cutter wheel mechanism 68 utilizes the base plate 70 of the ratchet wheel 66 and has a corresponding front plate 72, between which are pivotally mounted a pair of bearing guides 74, 76 and a pivot 78 for retaining a cutter wheel holder 80. A pair of cutter wheels 82 are rotatably mounted on the holder 80. An adjusting screw 84 is used for tightening the cutter wheels 82 against the pipe as the cutter wheel mechanism 68 is caused to rotate around the pipe upon movement of handle 60.

In FIG. 5 the circular dashed lines 86 represents a piece of tubing to be cut. Jaws 64 are positioned over the tubing which then bears against bearing guide 74 and the cutting wheels 82. Bearing guide 76 has a threaded aperture 88 into which is threadedly positioned the adjusting screw 84. The cutter wheel holder is pivotally mounted at 78 to the base plate 70 of ratchet wheel 66 and has an opening 90 through which the adjusting screw 84 passes. As the adjusting screw 84 is tightened against the action of spring 92 the cutter wheel 82 is moved closer to the bearing guide 74 and causes a cutting action on the tube 86 as it is rotated around the tube by manipulation of handle 60.

While there are conventional ratchet mechanisms well known in the art that will provide for a rotation in one direction, there is illustrated in FIGS. 6 and 7 an illustrative embodiment. A garter spring 94 is placed within the ratchet body 62 between spring retainers 96 in the ends of jaws 64. Within the ratchet body are circumferentially spaced recesses 98 communicating with smaller recesses 100. Associated with each set of recesses are small locking balls 102. The garter spring 94 extends about the periphery of these recesses and balls to urge the balls inwardly. The innermost part of the ratchet wheel 66 is the rotating ratchet member 104. This ratchet member rotates about an imaginary center point 106 and has an arcuate inner surface 108 which revolves around the tubing to be cut. The outer surface of the ratchet member has a plurality of flat surfaces 110 which vary from a minimum radius length at their midpoint shown in FIG. 6 by arrow 114 to a greater radius length at their ends shown by arrow 116. Thus, a wedging surface 112 is formed which strikes the balls 102 when handle 60 is rotated in a counterclockwise direction shown by arrow 118 in the view shown in FIG. 6. This moves the balls 102 into the deeper recesses 98 as the handle 60 is rotated and the rotating ratchet 104 remains unrotated on the tubing. As handle 60 is rotated in a clockwise direction, the balls are moved past the center of the flat surface 110, the garter spring 94 moves the balls against the surface and further rotation places the balls in the smaller recesses 100. Upon further rotation of the handle 60 in a clockwise direction, the balls jam against the wedging surface 112 and thus rotate the rotating ratchet 104. This, in turn, causes the cutter wheel mechanism 68 attached thereto to rotate and the cutting action is then performed.

As shown in FIG. 7, the balls 102 are prevented from falling out by means of retaining plates 114 which are annular collars secured to the ratchet body 62. The inner ends 116 are turned inwardly to prevent escape of the balls 102 which are urged inwardly by the garter spring 94.

Having thus described alternate forms of illustrative embodiments, it is to be understood that further modifications will readily occur to those skilled in the art and that it is to be understood that these modifications are to be considered as part of the present invention as claimed.

I claim:

1. A tube cutter comprising ratchet body jaws for placement over a tube to be cut, said jaws having a cutter wheel mechanism mounted thereon, a cutter wheel rotatably mounted on said cutter wheel mechanism, said cutter wheel mechanism including means for adjustably moving said cutter wheel against the outer surface of said tube to be cut, handle means for rotating said cutter wheel mechanism around said tube, said handle means including a ratchet body with said ratchet body jaws thereon, a rotating ratchet member undirectionally rotatable within said jaws, said cutter wheel mechanism being connected to said rotating ratchet member for rotation therewith, said cutter wheel mechanism being rotatable in one rotational direction around said tube by passing said handle through an arc in both rotational directions a plurality of times, said cutter wheel mechanism having a pair of axially spaced cutter wheels rotatably mounted thereon, said cutter wheels having shoulders thereon to engage and pass over the ends of the tube formed by cutting out a segment of tubing between said spaced wheels, and tube deforming means on said cutter holder between said spaced wheels for deforming inwardly said segment as it is being cut by said wheels.

2. A tube cutter as in claim 1 wherein said cutter wheel mechanism includes a pivotally mounted cutter holder and an adjusting screw is used to tighten said cutter wheels onto said tubing to be cut.

3. A tube cutter as in claim 1, said tube deforming means comprising a wheel having a diameter at least equal to that of said spaced cutter wheel.

4. A tube cutter as in claim 1, and a plurality of circumferentially spaced larger recesses communicating with smaller recesses within said ratchet body jaws, locking balls associated with each set of recesses, means urging said balls inwardly, said rotating ratchet member having wedging surfaces thereon to move said balls into said larger recesses when said handle is rotated in one direction and into said smaller recesses when rotating said handle in the opposite direction, said balls when in said smaller recesses jamming against said wedging surfaces and rotating said rotating ratchet member and said cutter wheel mechanism.

5. A tube cutter as in claim 1 wherein said ratchet body has a coil spring within said jaws, a plurality of circumferentially spaced larger recesses communicating with smaller recesses within said ratchet body, locking balls associated with each set of recesses, said spring extending about the periphery of said recesses to urge said balls inwardly, the innermost part of said ratchet wheel comprising a rotating ratchet member the outer surface of which has a plurality of flat surfaces varying from a minimum radius length at their midpoint to a greater radius length at their ends, thus providing wedging surfaces to move said balls into said larger recesses when said handle is rotated in one direction and into said smaller recesses when rotating said handle in the opposite direction, said balls when in said smaller recesses jamming against said wedging surfaces and rotating said rotating ratchet and said cutter wheel mechanism.

* * * * *